(12) United States Patent
Baptist et al.

(10) Patent No.: US 11,455,100 B2
(45) Date of Patent: Sep. 27, 2022

(54) HANDLING DATA SLICE REVISIONS IN A DISPERSED STORAGE NETWORK

(71) Applicant: International Business Machines Corporation, Armonk, NY (US)

(72) Inventors: Andrew D. Baptist, Mt. Pleasant, WI (US); Manish Motwani, Chicago, IL (US); Praveen Viraraghavan, Chicago, IL (US); Ilya Volvovski, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 95 days.

(21) Appl. No.: 16/451,242

(22) Filed: Jun. 25, 2019

(65) Prior Publication Data

US 2019/0310782 A1    Oct. 10, 2019

Related U.S. Application Data

(63) Continuation of application No. 15/440,454, filed on Feb. 23, 2017.

(51) Int. Cl.
*G06F 12/00* (2006.01)
*G06F 3/06* (2006.01)
(Continued)

(52) U.S. Cl.
CPC .......... *G06F 3/0619* (2013.01); *G06F 3/0604* (2013.01); *G06F 3/065* (2013.01);
(Continued)

(58) Field of Classification Search
CPC .... G06F 3/067; G06F 3/0619; G06F 11/1076; G06F 2211/1028
(Continued)

(56) References Cited

U.S. PATENT DOCUMENTS 4,092,732 A    5/1978  Ouchi
5,454,101 A    9/1995  Mackay et al.
(Continued)

OTHER PUBLICATIONS

List of IBM Patents or Patent Applications Treated as Related, dated Aug. 17, 2020, 1 page.
(Continued)

*Primary Examiner* — Mohamed M Gebril
(74) *Attorney, Agent, or Firm* — Randy Emilio Tejeda; Andrew D. Wright; Roberts Calderon Safran & Cole, P.C.

(57) ABSTRACT

A method for execution by a storage unit of a dispersed storage network (DSN) includes receiving a data slice for storage. A first bin that includes the data slice is generated and stored in a first location of a memory device of the storage unit, and a bin pointer that includes a reference to the first location is generated. A revision of the data slice is later received, and a second bin that includes the revised data slice is generated and stored in a second location of the memory device. A modified bin pointer is generated by editing the bin pointer to include a reference to the second location. A back pointer that references the first location is generated in response to commencing writing of the revised data slice. The back pointer is deleted in response to determining that the revised data slice has reached a finalized write stage.

20 Claims, 10 Drawing Sheets

(51) Int. Cl.
    *H04L 67/1097*    (2022.01)
    *G06F 11/10*    (2006.01)

(52) U.S. Cl.
    CPC ............ *G06F 3/067* (2013.01); *G06F 3/0638* (2013.01); *G06F 3/0647* (2013.01); *G06F 3/0652* (2013.01); *G06F 11/10* (2013.01); *G06F 11/1076* (2013.01); *H04L 67/1097* (2013.01)

(58) Field of Classification Search
    USPC .......................................................... 711/165
    See application file for complete search history.

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,864,875 A * | 1/1999 | Van Huben ............. G06F 30/00 |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,377,500 B1 * | 4/2002 | Fujimoto ............ G06F 12/0246 365/230.01 |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,552,148 B2 * | 6/2009 | Liu ..................... G06F 11/1435 714/24 |
| 7,636,724 B2 | 12/2009 | de la Torre et al. |
| 8,458,127 B1 * | 6/2013 | Lorch, III ........... G06F 11/1456 707/661 |
| 8,595,435 B2 * | 11/2013 | Cilfone ............... G06F 11/1076 711/170 |
| 8,625,637 B2 | 1/2014 | Baptist et al. |
| 8,667,273 B1 * | 3/2014 | Billstrom ........... G06F 21/6209 713/165 |
| 8,699,159 B1 | 4/2014 | Malina |
| 8,880,801 B1 * | 11/2014 | Robins ................ G06F 11/1092 711/170 |
| 8,892,598 B2 | 11/2014 | Motwani |
| 8,965,939 B2 | 2/2015 | Leggette et al. |
| 9,152,489 B2 * | 10/2015 | Baptist ..................... G06F 21/10 |
| 9,292,520 B1 * | 3/2016 | Madiraju Varadaraju ................... G06F 11/1451 |
| 9,462,316 B2 * | 10/2016 | Gladwin ............... H04L 69/329 |
| 9,571,570 B1 * | 2/2017 | Mutnuru .............. G06F 11/3433 |
| 9,621,427 B1 * | 4/2017 | Shah .................... G06F 9/45533 |
| 9,774,684 B2 * | 9/2017 | Dhuse ................. H04L 67/1097 |
| 9,785,510 B1 | 10/2017 | Madhavarapu et al. |
| 9,846,540 B1 * | 12/2017 | Franklin ............... G06F 3/0616 |
| 9,858,006 B1 * | 1/2018 | Wu ...................... G06F 12/0284 |
| 10,216,757 B1 * | 2/2019 | Armangau ........... G06F 16/178 |
| 10,360,928 B1 | 7/2019 | Brockie |
| 10,379,950 B2 | 8/2019 | Gholamipour et al. |
| 10,394,468 B2 | 8/2019 | Baptist et al. |
| 10,635,360 B1 | 4/2020 | Volvovski et al. |
| 10,754,574 B1 | 8/2020 | Jo et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2003/0126387 A1 * | 7/2003 | Watanabe ............ G06F 11/2058 711/161 |
| 2004/0024963 A1 | 2/2004 | Talagala et al. |
| 2004/0098545 A1 * | 5/2004 | Pline ................... G06F 13/1684 711/115 |
| 2004/0122917 A1 | 6/2004 | Menon et al. |
| 2004/0177100 A1 * | 9/2004 | Bjorner ............... G06F 12/0253 |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2005/0283649 A1 * | 12/2005 | Turner ................. H04L 67/1095 714/6.12 |
| 2006/0047907 A1 | 3/2006 | Shiga et al. |
| 2006/0107010 A1 * | 5/2006 | Hirezaki .............. G06F 3/0647 711/165 |
| 2006/0136448 A1 | 6/2006 | Cialini et al. |
| 2006/0156059 A1 | 7/2006 | Kitamura |
| 2006/0224603 A1 | 10/2006 | Correll |
| 2007/0006322 A1 * | 1/2007 | Karimzadeh ........ G06F 21/6227 726/28 |
| 2007/0078901 A1 * | 4/2007 | Satou ..................... G06F 3/0685 |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2007/0299887 A1 * | 12/2007 | Novik .................. G06F 16/273 707/999.203 |
| 2008/0320243 A1 * | 12/2008 | Mitsuzuka ........... G06F 15/167 711/E12.016 |
| 2009/0094251 A1 | 4/2009 | Gladwin et al. |
| 2009/0094318 A1 | 4/2009 | Gladwin et al. |
| 2009/0112823 A1 | 4/2009 | Aharonov et al. |
| 2009/0217056 A1 * | 8/2009 | Malpani ................ G06F 21/41 713/193 |
| 2010/0023524 A1 | 1/2010 | Gladwin et al. |
| 2010/0094955 A1 * | 4/2010 | Zuckerman ......... H04L 67/1097 709/219 |
| 2010/0153638 A1 * | 6/2010 | Yochai ................ G06F 11/2092 711/E12.019 |
| 2010/0235321 A1 * | 9/2010 | Shukla .................... H04L 67/10 707/610 |
| 2011/0029711 A1 * | 2/2011 | Dhuse .................. G06F 11/1092 711/170 |

(56) References Cited

U.S. PATENT DOCUMENTS

| | | | |
|---|---|---|---|
| 2011/0029731 A1* | 2/2011 | Cilfone | G06F 11/1076 711/170 |
| 2011/0029809 A1* | 2/2011 | Dhuse | G06F 11/1092 714/6.1 |
| 2011/0060974 A1* | 3/2011 | Viger | H04L 1/0009 714/E11.032 |
| 2011/0071988 A1* | 3/2011 | Resch | G06F 11/1076 707/E17.007 |
| 2011/0072210 A1* | 3/2011 | Dhuse | G06F 11/1076 711/114 |
| 2011/0072321 A1* | 3/2011 | Dhuse | G06F 11/1076 714/E11.023 |
| 2011/0078373 A1* | 3/2011 | Hoffman | G06F 16/1827 711/170 |
| 2011/0106904 A1* | 5/2011 | Resch | G06F 11/1076 711/E12.002 |
| 2011/0125999 A1* | 5/2011 | Cilfone | G06F 16/172 711/E12.001 |
| 2011/0161666 A1* | 6/2011 | Gladwin | H04L 67/1097 711/E12.092 |
| 2011/0184997 A1* | 7/2011 | Grube | H04L 67/1097 707/827 |
| 2011/0185141 A1* | 7/2011 | Dhuse | G06F 3/067 711/E12.002 |
| 2011/0225362 A1* | 9/2011 | Leggette | G06F 3/0619 711/114 |
| 2011/0225386 A1* | 9/2011 | Motwani | G06F 11/1076 711/170 |
| 2011/0228931 A1* | 9/2011 | Grube | G06F 11/10 713/189 |
| 2011/0276744 A1* | 11/2011 | Sengupta | G11C 7/1072 711/216 |
| 2011/0295796 A1* | 12/2011 | Muhunthan | G06F 16/27 707/610 |
| 2011/0296133 A1* | 12/2011 | Flynn | G06F 3/0652 711/171 |
| 2012/0005440 A1* | 1/2012 | Nakao | G06F 3/0685 711/E12.002 |
| 2012/0089809 A1* | 4/2012 | Resch | G06F 11/08 711/206 |
| 2012/0102316 A1* | 4/2012 | Resch | G06F 11/1076 713/150 |
| 2012/0117351 A1* | 5/2012 | Motwani | G06F 3/0605 711/E12.002 |
| 2012/0137091 A1* | 5/2012 | Grube | G06F 12/0638 711/158 |
| 2012/0137095 A1 | 5/2012 | Grube et al. | |
| 2012/0163596 A1* | 6/2012 | Grube | G06F 3/067 380/252 |
| 2012/0166757 A1* | 6/2012 | Volvovski | G06F 3/0604 711/206 |
| 2012/0179887 A1* | 7/2012 | Maruyama | G06F 3/061 711/E12.103 |
| 2012/0198197 A1* | 8/2012 | Gladwin | G06F 16/1727 711/170 |
| 2012/0221611 A1* | 8/2012 | Watanabe | G06F 3/0671 707/827 |
| 2012/0278569 A1* | 11/2012 | Kawakami | G06F 3/0641 711/E12.103 |
| 2012/0311068 A1* | 12/2012 | Gladwin | H04N 21/00 709/214 |
| 2013/0173561 A1* | 7/2013 | Cherian | G06F 3/0641 707/E17.005 |
| 2013/0198130 A1* | 8/2013 | Resch | G06F 11/08 707/609 |
| 2013/0232307 A1* | 9/2013 | Clifone | H04L 67/1097 711/154 |
| 2013/0238900 A1* | 9/2013 | Leggette | G06F 11/2058 713/165 |
| 2013/0275545 A1* | 10/2013 | Baptist | H04L 67/01 709/215 |
| 2013/0275699 A1* | 10/2013 | Cheriton | G06F 12/00 711/162 |
| 2013/0275744 A1* | 10/2013 | Resch | H04L 67/10 713/150 |
| 2013/0282953 A1* | 10/2013 | Orme | G06F 12/0246 711/102 |
| 2013/0304746 A1* | 11/2013 | Dhuse | G06F 16/322 707/743 |
| 2013/0318313 A1* | 11/2013 | Clifford | G06F 11/1461 711/E12.103 |
| 2013/0326264 A1* | 12/2013 | Resch | G06F 11/1088 714/6.2 |
| 2013/0339316 A1* | 12/2013 | Hirsch | G06F 3/0641 707/E17.032 |
| 2013/0339420 A1* | 12/2013 | Srinivasan | H04L 69/329 709/201 |
| 2013/0346716 A1* | 12/2013 | Resch | G06F 3/067 711/162 |
| 2013/0346795 A1* | 12/2013 | Gladwin | G06F 3/0619 714/6.22 |
| 2014/0068259 A1* | 3/2014 | Resch | H03M 13/611 713/189 |
| 2014/0074786 A1* | 3/2014 | Leggette | G06F 3/0689 707/638 |
| 2014/0156716 A1 | 6/2014 | Baptist et al. | |
| 2014/0195875 A1* | 7/2014 | Resch | G06F 11/1092 714/763 |
| 2014/0236913 A1* | 8/2014 | Chakradhar | G06F 16/2343 707/703 |
| 2014/0279912 A1* | 9/2014 | Anglin | G06F 11/2023 707/640 |
| 2014/0281804 A1* | 9/2014 | Resch | H04L 67/06 714/763 |
| 2014/0281817 A1* | 9/2014 | Grube | H04L 41/5054 714/769 |
| 2014/0325157 A1* | 10/2014 | Sangapu | G06F 3/0689 711/126 |
| 2014/0330923 A1* | 11/2014 | Baptist | G06F 11/1474 709/213 |
| 2014/0344227 A1* | 11/2014 | Grube | G06F 3/0647 707/812 |
| 2014/0344617 A1* | 11/2014 | Resch | G06F 11/1092 714/6.31 |
| 2014/0351457 A1* | 11/2014 | Baptist | H04L 69/22 710/5 |
| 2015/0002522 A1* | 1/2015 | Nalluri | G06T 1/20 345/522 |
| 2015/0006780 A1* | 1/2015 | Shao | G06F 13/4221 710/316 |
| 2015/0100846 A1 | 4/2015 | Gladwin | |
| 2015/0113326 A1* | 4/2015 | Talagala | G06F 11/1441 714/24 |
| 2015/0347440 A1* | 12/2015 | Habouzit | G06F 16/1734 707/824 |
| 2016/0070652 A1* | 3/2016 | Sundararaman | G06F 3/0647 711/154 |
| 2016/0142249 A1* | 5/2016 | Wu | G06F 3/0683 709/222 |
| 2016/0170871 A1* | 6/2016 | Hyun | G06F 3/06 711/103 |
| 2016/0188253 A1* | 6/2016 | Resch | G06F 3/0647 711/172 |
| 2016/0278014 A1* | 9/2016 | Chen | H04W 52/0235 |
| 2017/0153942 A1* | 6/2017 | Cabral | G06F 3/064 |
| 2017/0185312 A1 | 6/2017 | Smith et al. | |
| 2017/0353580 A1* | 12/2017 | Horan | G06F 9/5011 |
| 2017/0371542 A1 | 12/2017 | Dhuse et al. | |
| 2018/0107397 A1* | 4/2018 | Gray | G06F 3/064 |
| 2018/0107431 A1* | 4/2018 | Resch | G06F 3/0607 |
| 2018/0107545 A1* | 4/2018 | Gray | G06F 11/1076 |
| 2018/0239546 A1 | 8/2018 | Baptist et al. | |
| 2018/0241818 A1 | 8/2018 | Baptist et al. | |
| 2018/0246670 A1 | 8/2018 | Baptist et al. | |
| 2018/0373459 A1* | 12/2018 | Resch | G06F 3/0604 |
| 2019/0171721 A1 | 6/2019 | Oukid et al. | |

(56) References Cited

U.S. PATENT DOCUMENTS

| | | | | |
|---|---|---|---|---|
| 2019/0310782 | A1* | 10/2019 | Baptist | G06F 3/065 |
| 2020/0218471 | A1* | 7/2020 | Chen | G06F 3/0673 |
| 2020/0356300 | A1 | 11/2020 | Mahajan et al. | |

OTHER PUBLICATIONS

Chung; An Automatic Data Segmentation Method for 3D Measured Data Points; National Taiwan University; pp. 1-8; 1998.

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

"List of IBM Patents or Patent Applications Treated as Related", dated Sep. 8, 2021, 1 page.

Office Action dated Jun. 9, 2021 in related U.S. Appl. No. 16/811,477, 15 pages.

Anonymous, "Cutting the cord: Why we took the file system out of our storage nodes," http:l/docplayer.net/63782459-Cutting-the-cord-why-we-took-the-file-system-out-of-our-storage-nodes_html, accessed Apr. 23, 2020, 4 pages.

Mell et al., "The NIST Definition of Cloud Computing", NIST, Special Publication 800-145, Sep. 2011, 7 pages.

Leonard et al., "IBM Cloud Object Storage Concepts and Architecture System Edition", IBM Redbooks, 2019, 34 pages.

Anonymous, "Packed Slice Storage", IBM Cloud Object Storage System™ Version 3.14.0, 2016, 28 pages.

Office Action dated Sep. 29, 2021 in related U.S. Appl. No. 16/811,477, 19 pages.

Office Action dated May 25, 2022 in related U.S. Appl. No. 16/811,477, 17 pages.

* cited by examiner

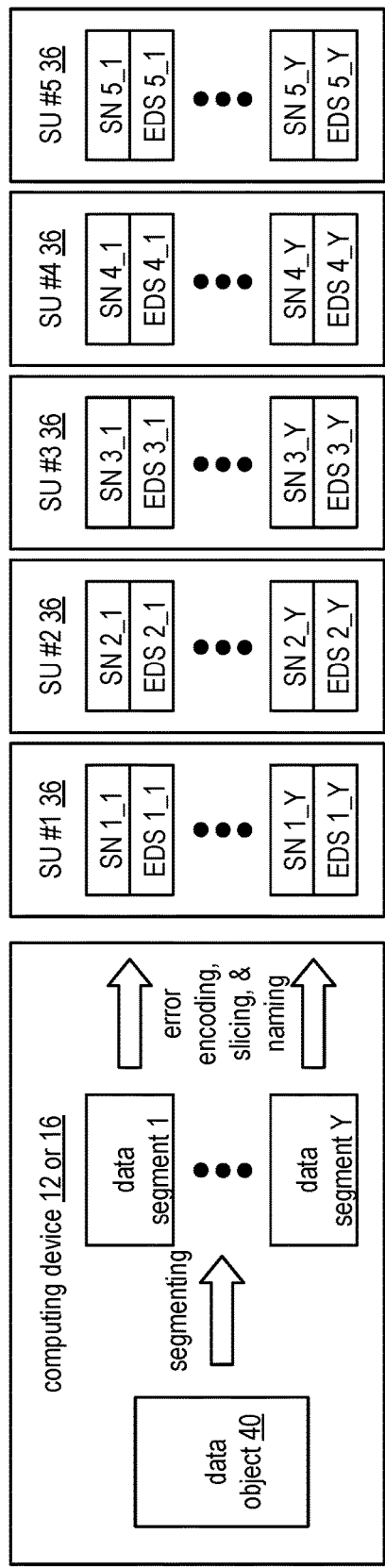
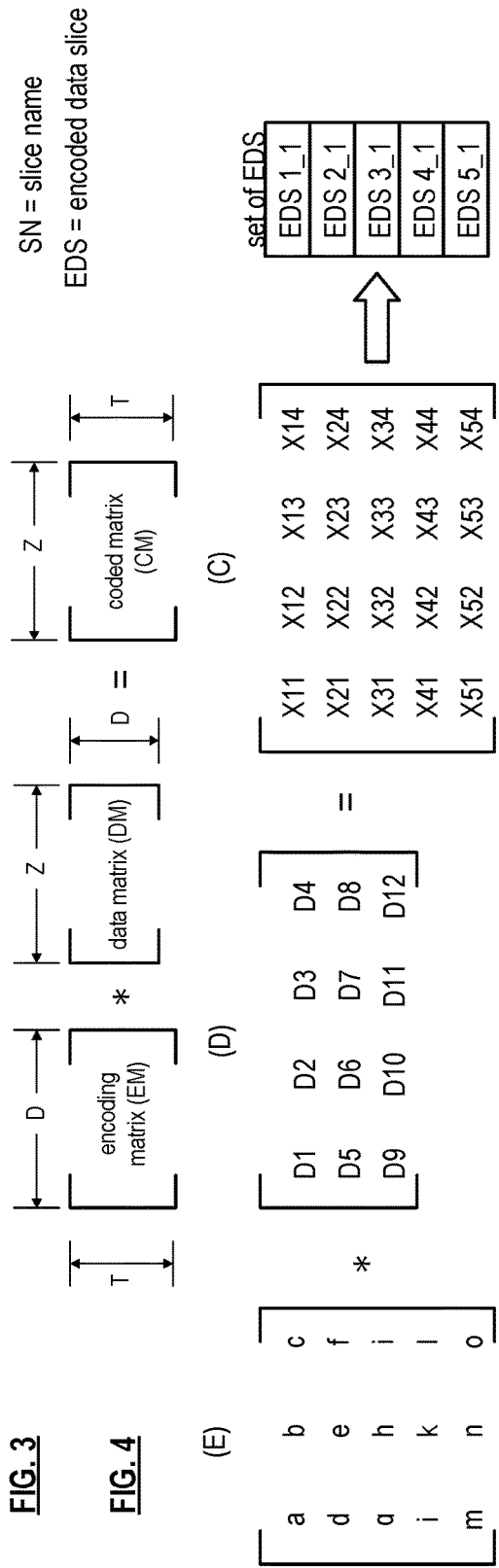
FIG. 3
FIG. 4
FIG. 5
FIG. 6

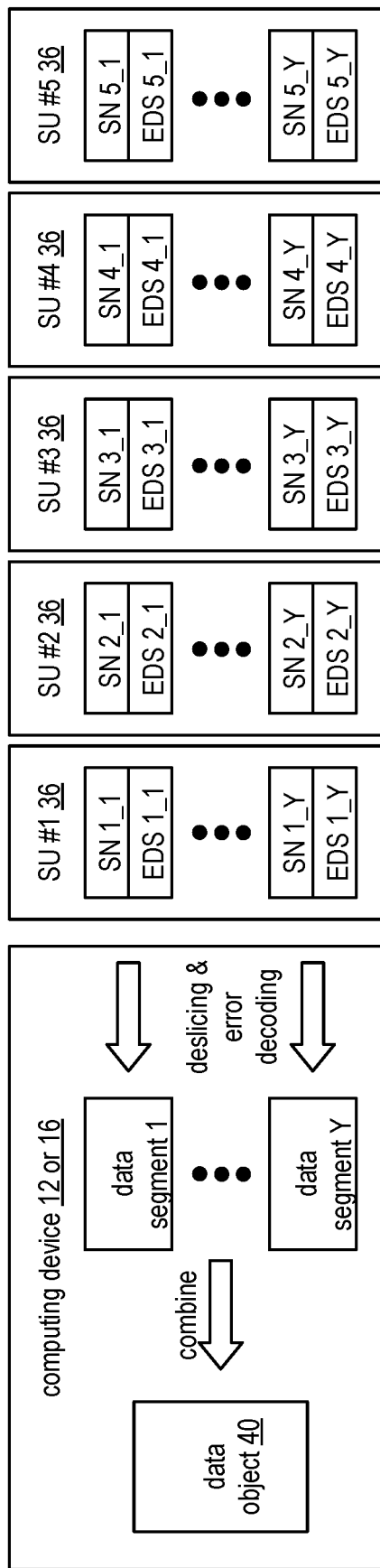

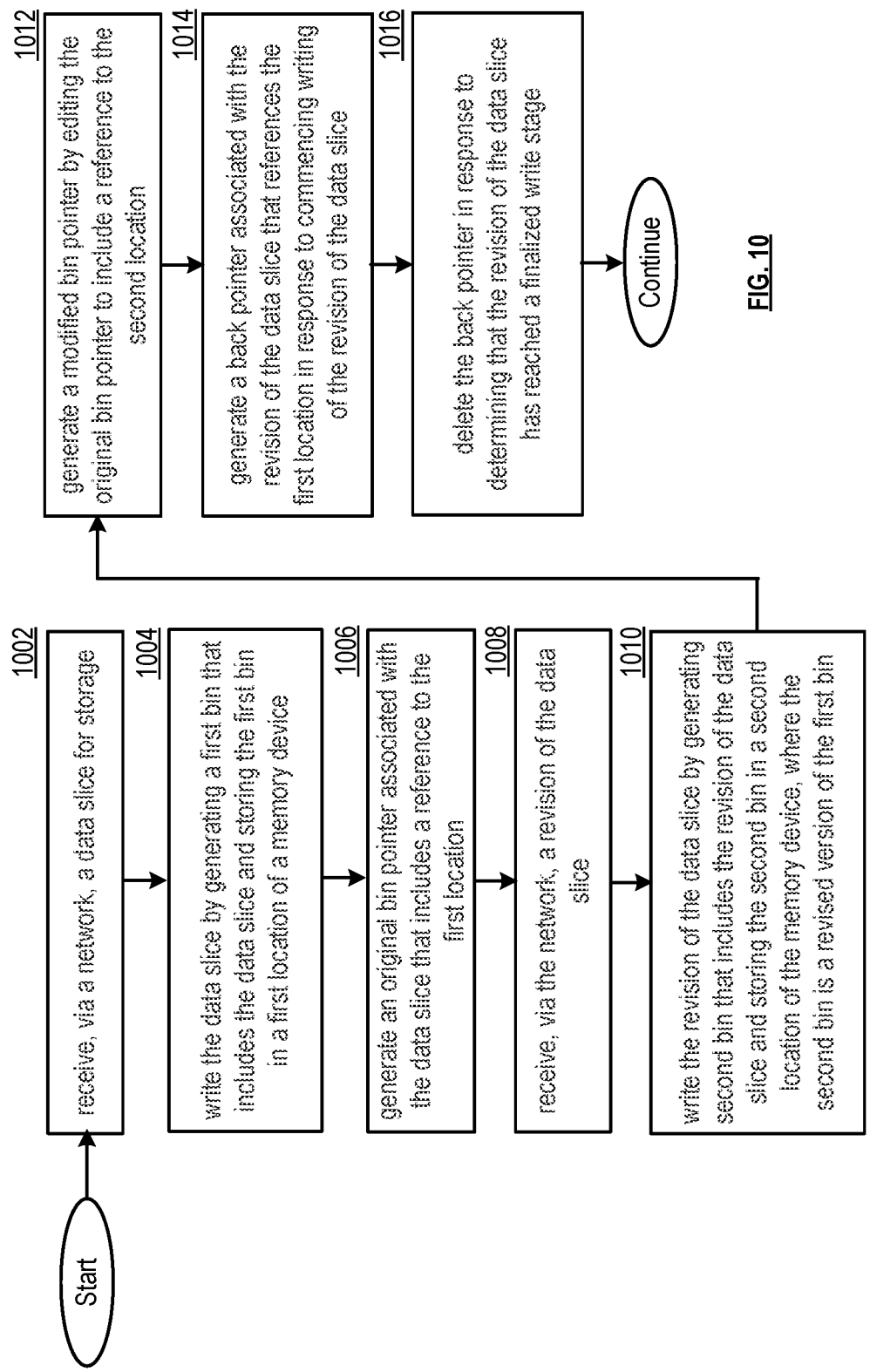

HANDLING DATA SLICE REVISIONS IN A DISPERSED STORAGE NETWORK

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 7 is a schematic block diagram of an example of dispersed storage error decoding of data in accordance with the present invention;

FIG. 8 is a schematic block diagram of a generic example of an error decoding function in accordance with the present invention;

FIG. 10 is a logic diagram of an example of a method of handling data slice revisions in accordance with the present invention.

DETAILED DESCRIPTION OF THE INVENTION

Figure 1:
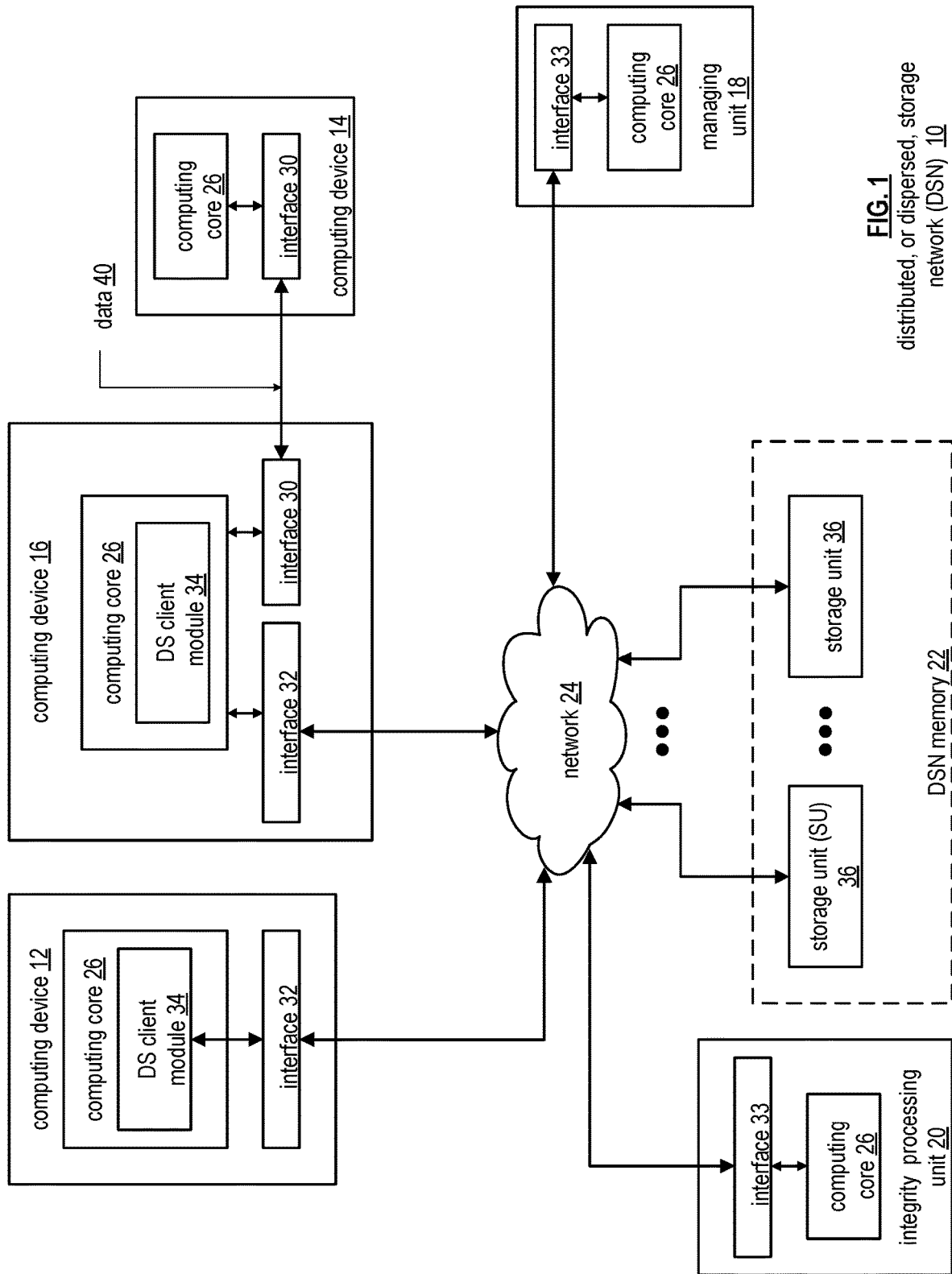
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
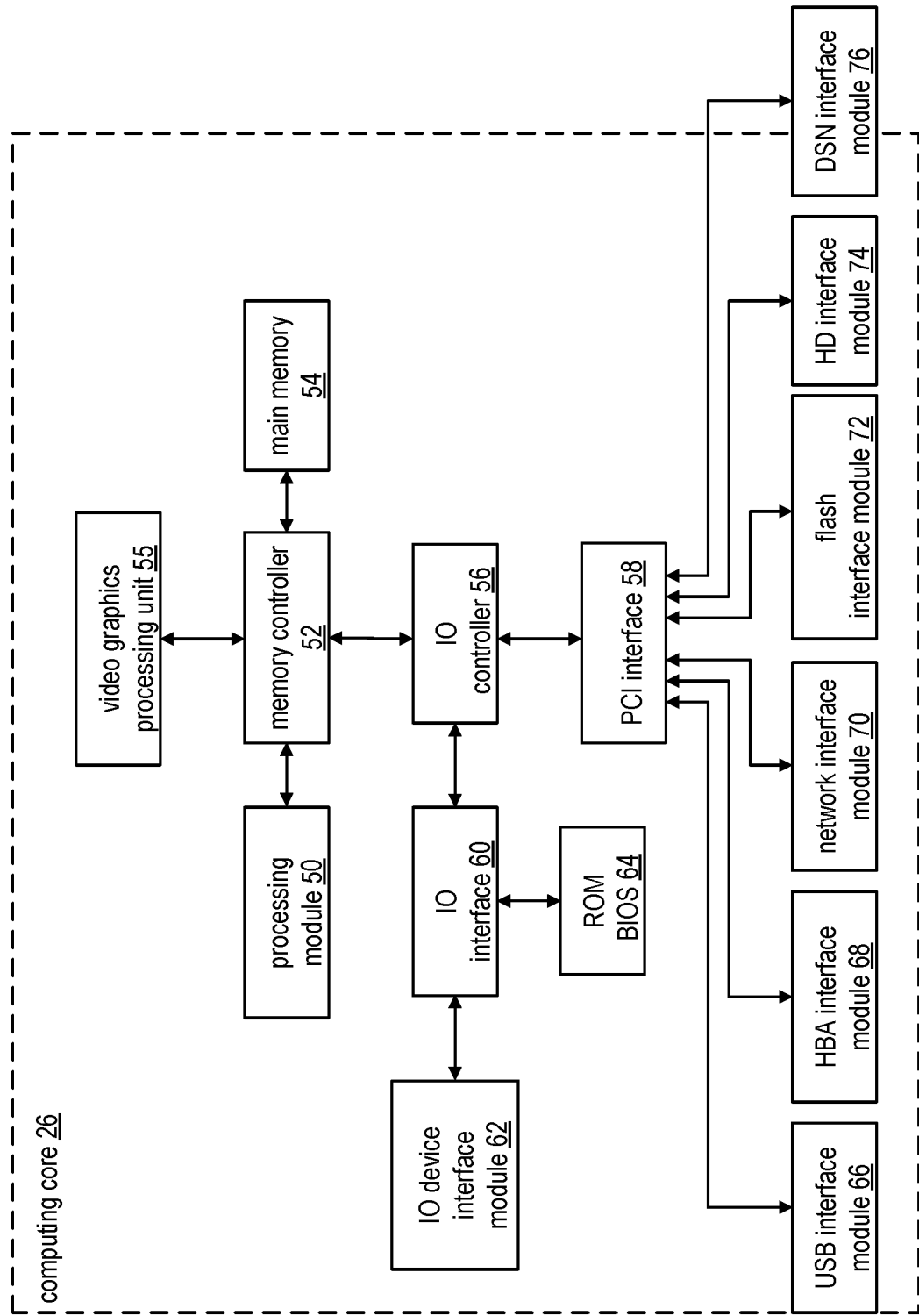
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) memory devices for storing dispersed error encoded data. Some or all of the storage units can include append optimal storage devices that store data according to an append-only write scheme on one or more memory devices of the storage unit.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
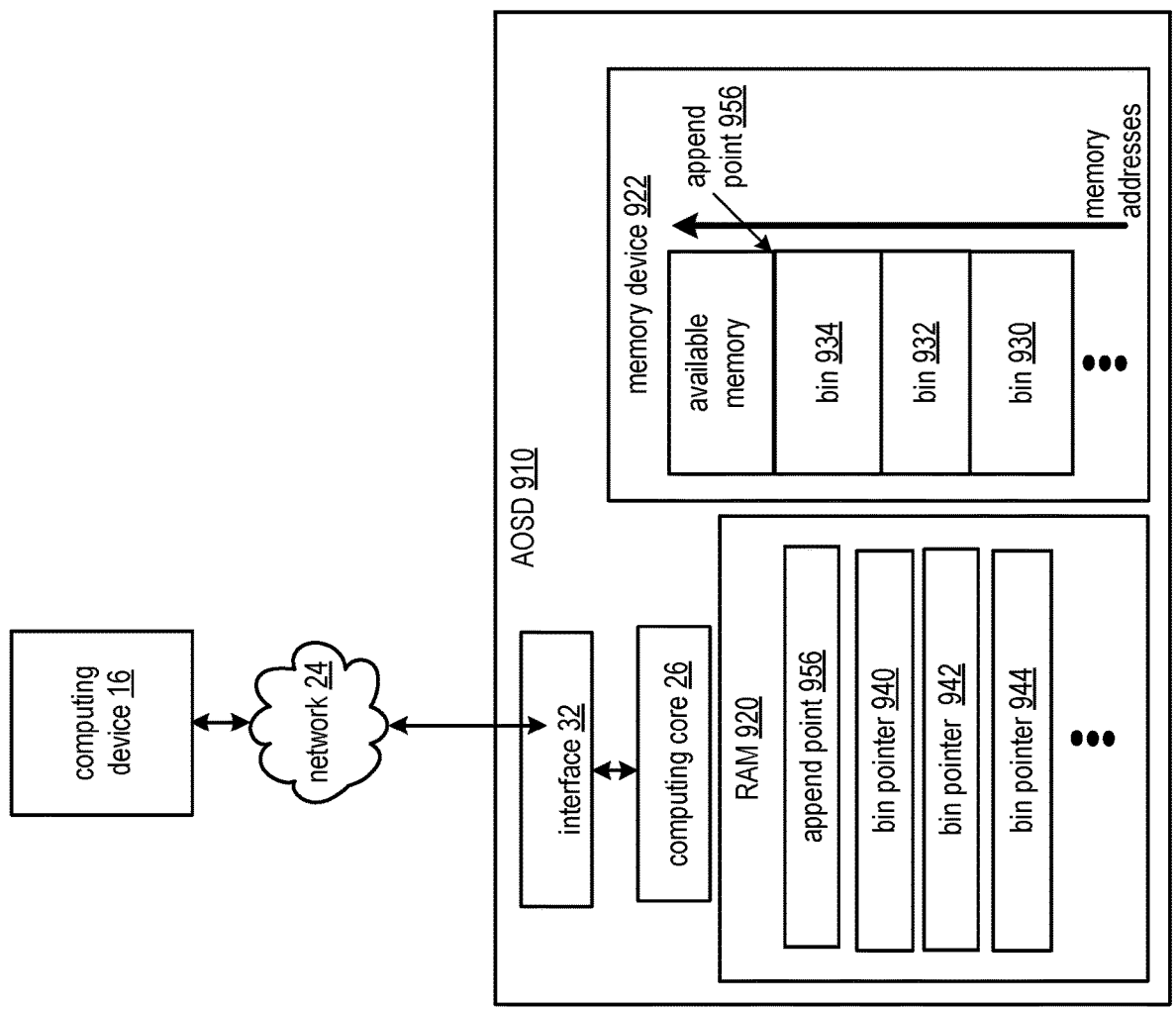
FIG. 9A is a schematic block diagram of an embodiment of a dispersed or distributed storage network (DSN) in accordance with the present invention.

FIG. 9A is a schematic block diagram of another embodiment of a dispersed storage network (DSN) that includes a computing device 16 of FIG. 1, the network 24 of FIG. 1, and at least one Append Optimal Storage Devices (AOSD) 910. Each AOSD 910 can be implemented by utilizing the storage unit 36 of FIG. 1, and may hereafter interchangeably be referred to as a storage unit. Each AOSD 910 can include a memory device 922 that stores a plurality of bins, including bins 930, 932, and 936 to store data slices according to an append-only write scheme. Each AOSD can further include a random access memory (RAM) 920 that stores a plurality of bin pointers referencing locations of the plurality of bins. The memory device 922 and/or the RAM can be implemented by utilizing the computing core 26 of FIG. 2, for example, by utilizing memory 54, and/or each AOSD can also include a separate computing core 26 and/or interface 32 of FIG. 1 to receive and/or send data via network 24. The DSN functions to handle storing revised data slices.

Append Optimal Storage Devices (AOSD) are memory devices for which appended writes are the optimal form of access and/or utilize an append-only write scheme when storing data. Using AOSD for data storage in the DSN provides more opportunities to control the performance as well as efficient use of the storage media, for example, memory device 922. The append-only write scheme dictates that new data objects and/or slices are written by being "appended" to an end, or append point such as append point 956, in storage. As data slices are written, they are written to the next space in memory according to the append point, and the append point is updated based on the length of newly written data. The append point can be maintained in RAM 920 or in other memory of the AOSD, and can be stored as a pointer or other reference to the append point location of the memory device 922.

The concept of physical zones that allow for the append-only nature on the media creates an architecture that requires a mapping out of the logical layout of slices on the memory device. To perform this mapping, "bin pointers" are used to locate a slice (stored in a bin) on an AOSD. Bin pointers are maintained in a random-access memory such as RAM 920 on the storage unit, or in other memory on the storage unit, or in other memory of the DSN. Bin pointers reference the location in the AOSD of where a given slice is held. For example, the bin pointer can include information about the memory device, zone, file, offset, and/or length of the "bin" in which a slice is held. The AOSD can have one or more memory devices, each with one or more zones or files, where each memory device, zone, and/or file can be maintained separately using the append-only writes, each with their own append point that is maintained by the AOSD.

The append-write requirement affects the protocol for revising a data object: as opposed to the original object being overwritten with a revised data object in its original location, revised data objects are appended at a new memory location based on the append point. This means that during a slice-overwrite of a new slice revision, there will necessarily be two simultaneous instances of the slice at the same time (the former slice written to a previous location) and the newly written slice written to the append point. The location of the original object is invalid for future writing, and that space in memory is only reclaimed when clean up routine is performed because directly or immediately overwriting/deleting the old slice is not necessarily possible or efficient in an AOSD.

In an inefficient system, when the data is updated, a new version of the bin must be written containing both the new slice and any/all previous extant revisions of that slice. Taking into consideration the various stages of a write, which can include a write stage, a commit stage, and/or a finalize stage, this also leads to several inefficient operations. Consider a first algorithm for storing an original version of a slice, referred to here as slice A_0, which can be any slice stored in memory device 922 such as original slice 960 of FIGS. 9B-9E. This slice is later replaced with a revised version of slice A, referred to here as slice A_1, which can also be any slice stored in memory device 922 at a later time, for example, revised slice 964 of FIGS. 9B-9E. Times 1, 2, and 3 can correspond to any timestamps where time 1 is previous to time 2, and time 2 is previous to time 3. Times 1-3 can, for example correspond to steps 902-906 of FIGS. 9B-9D. The steps to this first algorithm are as follows:

Time 1: Create bin_x to include slice A_0
Write bin_x(A_0) to append point
Create pointer A that points to the location of bin_x
Time 2: Create bin_y to include slices A_0 and A_1
Write bin_x(A_0, A_1) to append point
Modify pointer A to point to location of bin_y
Time 3: Slice A_1 is finalized, and revision A_0 is deleted
Write bin_z(A_1) to append point
Modify pointer A to point to location of bin_z Note that bin_x, bin_y, and bin_z can be any bins stored on the memory device, for example, where bin_x is bin 930 and bin_y is bin 932, and bin_z is 934. In other embodiments, there can be any number of additional bins between bin_x, bin_y, and bin_z. Pointer A can be any pointer stored on RAM, such as pointer 940. In various embodiments, rather than modifying pointer A as each new bin is created, new pointers B and/or C, such as pointers 942 and 944, can be created accordingly, stored separately on RAM.

This design causes a tripling of the amount of I/O to the memory device: instead of merely writing revision A_1, revision A_1 is written twice, and the slice A_0 is written again. As a result, this increases the duration of the interim period between commencement of writing the new revision and reaching finalization.

It is possible to overcome this inefficiency by changing the manner in which bin pointers operate. In particular, allowing bin pointers to point to multiple locations and adapting the protocol can minimize the interim period between commencement of writing the new revision and reaching write finalization. Such an algorithm for achieving this improvement includes the following steps:

Time 1: Create bin_x to include slice A_0
Write bin_x(A_0) is to append point
Create pointer A that points to the location of bin_x
Time 2: Create bin_y to include slices A_1
Create a back pointer that references previous bin
Write bin_x(A_0)←bin_y(A_1) to append point
Modify pointer A to point to location of bin_y
Time 3: Determine slice A_1 is finalized
Remove back pointer (bin_y no longer points to bin_x)

When the first revision is stored, a bin and a bin pointer are created. When the next revision A_1 is written, the bin is written on the media with a back pointer link to the bin holding slice A_0. The back pointer is created when the write-commit phase commences, and is maintained in memory throughout the write-commit phase. The back pointer can point to the location of bin_x and can also include information about the memory device, zone, file, offset, and/or length of bin_x. The back pointer to the old bin is broken when the slice revision is finalized, for example, in response to receiving a finalization notification or otherwise determining that the write has reached the finalize stage. The back pointer can be utilized if the write does not finalize to revert to the previous revised version of slice A, by modifying the pointer A to point to the location of bin_x based on the back pointer. Alternatively or in addition, the original slice A_0 can be rewritten to the append point, after retrieving the slice from bin_x by utilizing the back pointer, and pointer A can be modified to point to the new location.

The original slice can be deleted to free up disk space at a scheduled cleanup time, in response to determining free disk space is low, and/or at an otherwise optimal garbage collection time. The memory structure no longer referenced by bin pointers in RAM can be deleted from the disk structure during a cleanup. Thus, the on disk bin structure only is touched once per revision write, and only the pointer structure in RAM need be updated at a higher frequency. A cleanup agent can determine bins that are outdated based on regions of memory that aren't referenced by bin pointers in RAM and/or by determining whether or not back pointers exist for bins in memory to determine that previous versions need remain on disk. Alternatively or in addition, the storage unit can flag and/or maintain a list of outdated bins that includes back pointers as they are deleted from RAM and/or other relevant information such as location and/or offset information of outdated bins. Outdated bins can be identified in response to determining a revision has reached the finalized write state based on the back pointer of the bin before the back pointer is deleted.

The back pointer can be created based on the original pointer A before pointer A is modified, and/or the original pointer A can be repurposed as the back pointer. Alternatively or in addition, the back pointer can instead point to an instance of another pointer in RAM associated with bin_x such as the original pointer A. Alternatively or in addition, the back pointer can be stored in the new bin_y when its created, and can be deleted from bin_y at finalization and/or utilized to revert to slice A_0 if finalization fails. Alternatively or in addition, the back pointer can be stored in RAM as a separate pointer associated with the revision of the slice, before modification. The back pointer can be deleted from RAM when finalization is reached. Alternatively or in addition, a separate pointer B can be created for revision A_1 in bin_y, and pointer B can include the back pointer pointing to pointer A. Alternatively or in addition, back pointers are included in pointer A, and as a result pointer A includes references to multiple locations in memory: a reference to the location of bin_x and a reference to the location of bin_y.

Figure 9B:
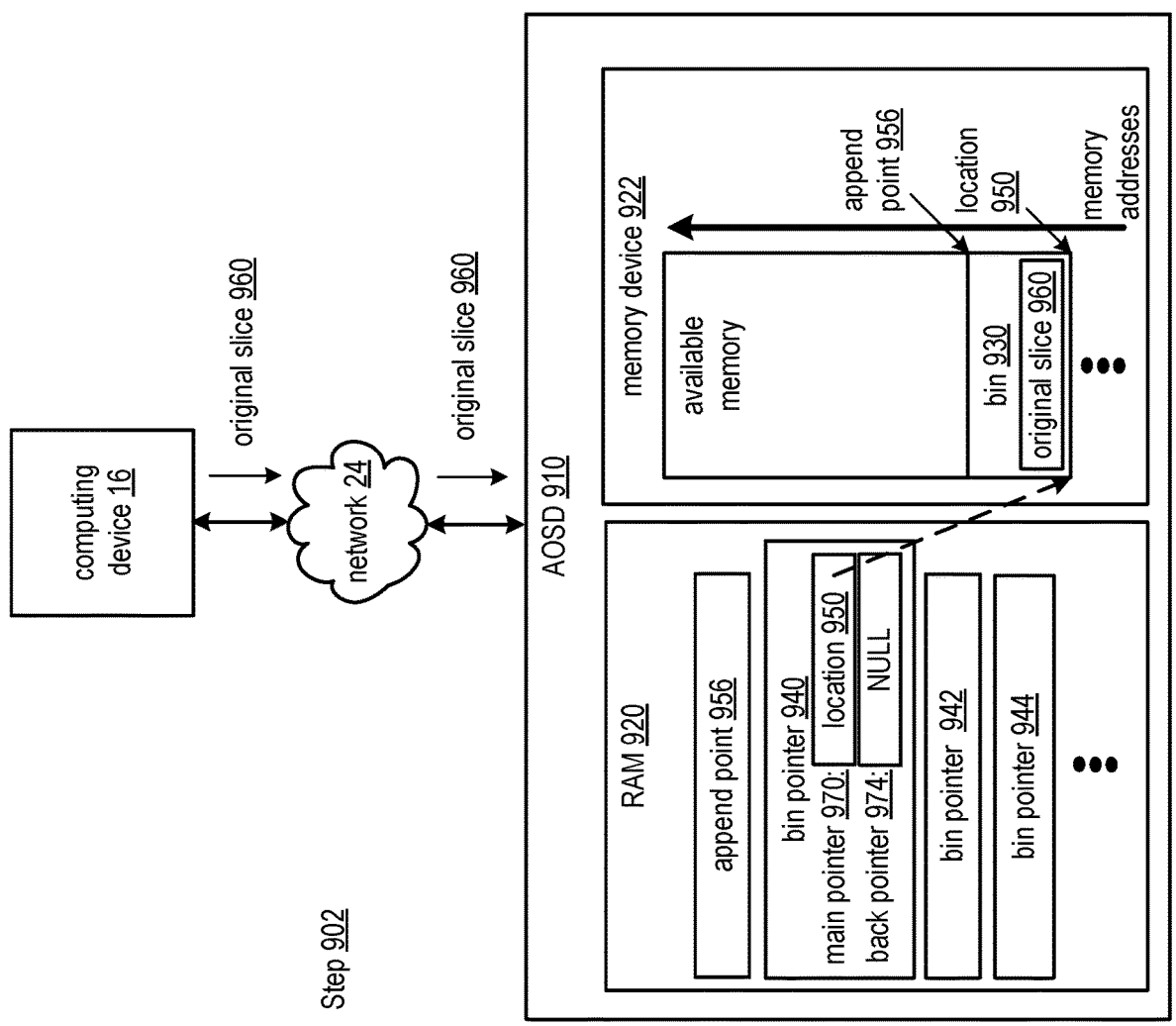
FIGS. 9B-9E are schematic block diagrams of a particular embodiment of a dispersed or distributed storage network (DSN) in accordance with the present invention.

FIGS. 9B-9E illustrate a particular scheme for maintaining back pointers, in particular, where bin pointers point to multiple locations in memory. For example, bin pointers, such as bin pointer 940, can include a main pointer field 970 and a back pointer field 974. The back pointer field can include a reference to, or otherwise point to, the location of the bin that stores the previous revision. Main pointer field 970 and/or back pointer field 974 can also include other data relating to their respective bins of reference such as offset information, length information, zone information, memory device information and/or file information. The back pointer field can be assigned to a null value when the bin pointer corresponds to an original slice is stored and/or after a back pointer is removed in response to a slice revision finalizing. Consider the following algorithm associated with this case:

Time 1: Create bin to include slice A_0
Write bin_x(A_0) to append point
Create pointer A:
  Main pointer→bin_x(A_0), back pointer→NULL
Time 2: Create bin_y to include slices A_1
Write bin_y(A_1) to append point
Modify pointer A:
  Main pointer→bin_y(A_1), back pointer→bin_x(A_0)
Time 3: Determine slice A_1 is finalized
Modify pointer A:
  Main pointer→bin_y(A_1), back pointer→NULL FIG. 9B illustrates a step 902 of the algorithm corresponding to time 1. Bin 930 can be created to store original slice 960 received via the network, for example, from computing device 16 or another entity of the DSN. Bin 930 can be stored in location 950, based on an append point 956 immediately prior to performing step 902. The append point 956 can be updated to a new location that corresponds to location 950 plus an offset determined by the length of the bin 930. Bin pointer 940 can be created to map to this slice, and can include a main pointer 970 that points to location 950. Because this is the original instance of this slice, back pointer 974 is assigned a null value to indicate that no prior versions of slice 960 are pending a write finalization.

Figure 9C:
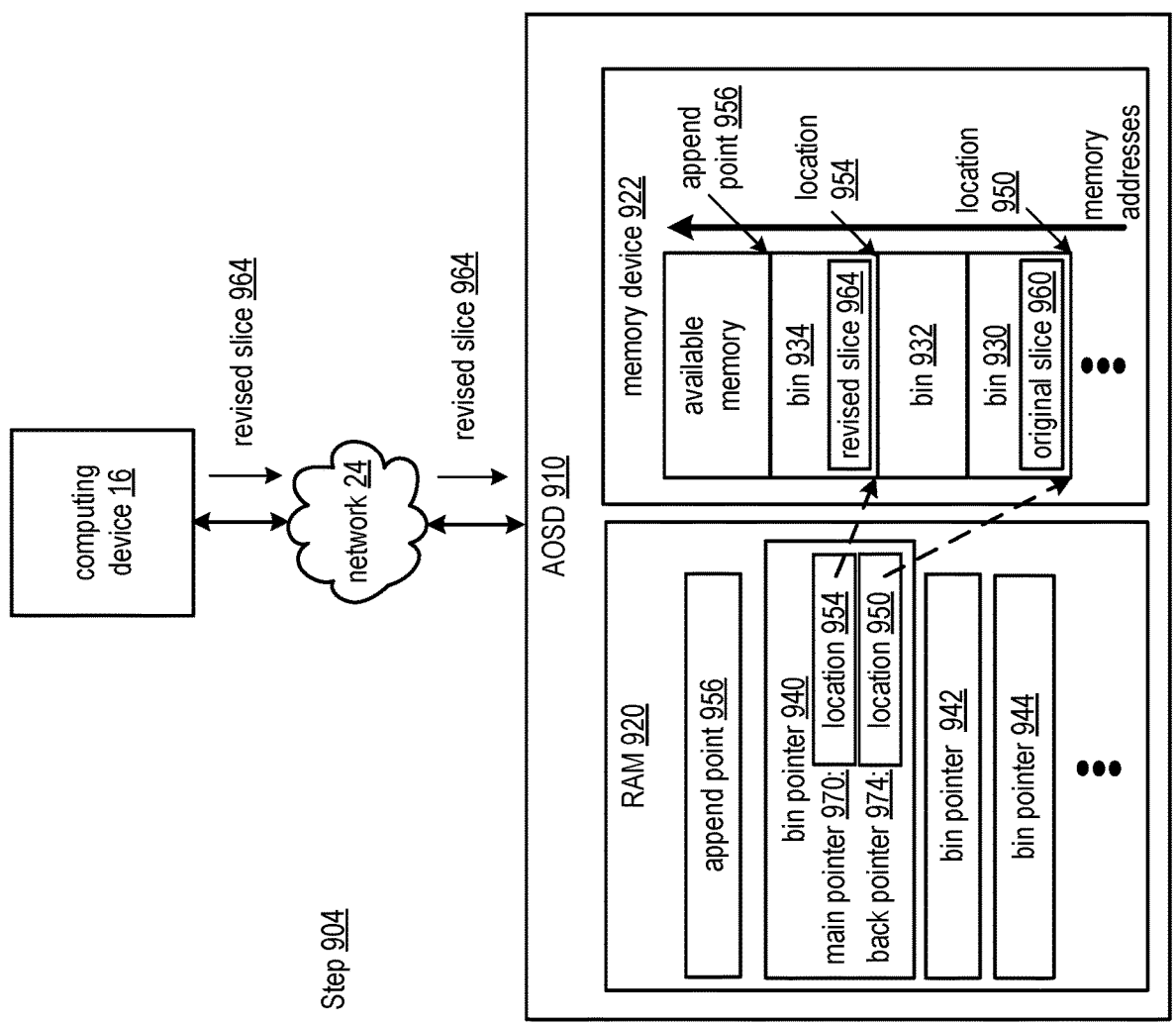

FIG. 9C illustrates a step 904 of the algorithm that corresponds to time 2. A revised slice 964 is received via the network from computing device 16 or another entity, and is stored in bin 934 at location 954 based on the current append point, which may have an offset from location 950 based on a plurality of other bins stored between step 902 and step 904. The append point is again updated. The bin pointer 940 is updated accordingly, where the back pointer references location 950 based on the previous value stored in main pointer 970. The main pointer 970 is updated to reference location 954.

Figure 9D:
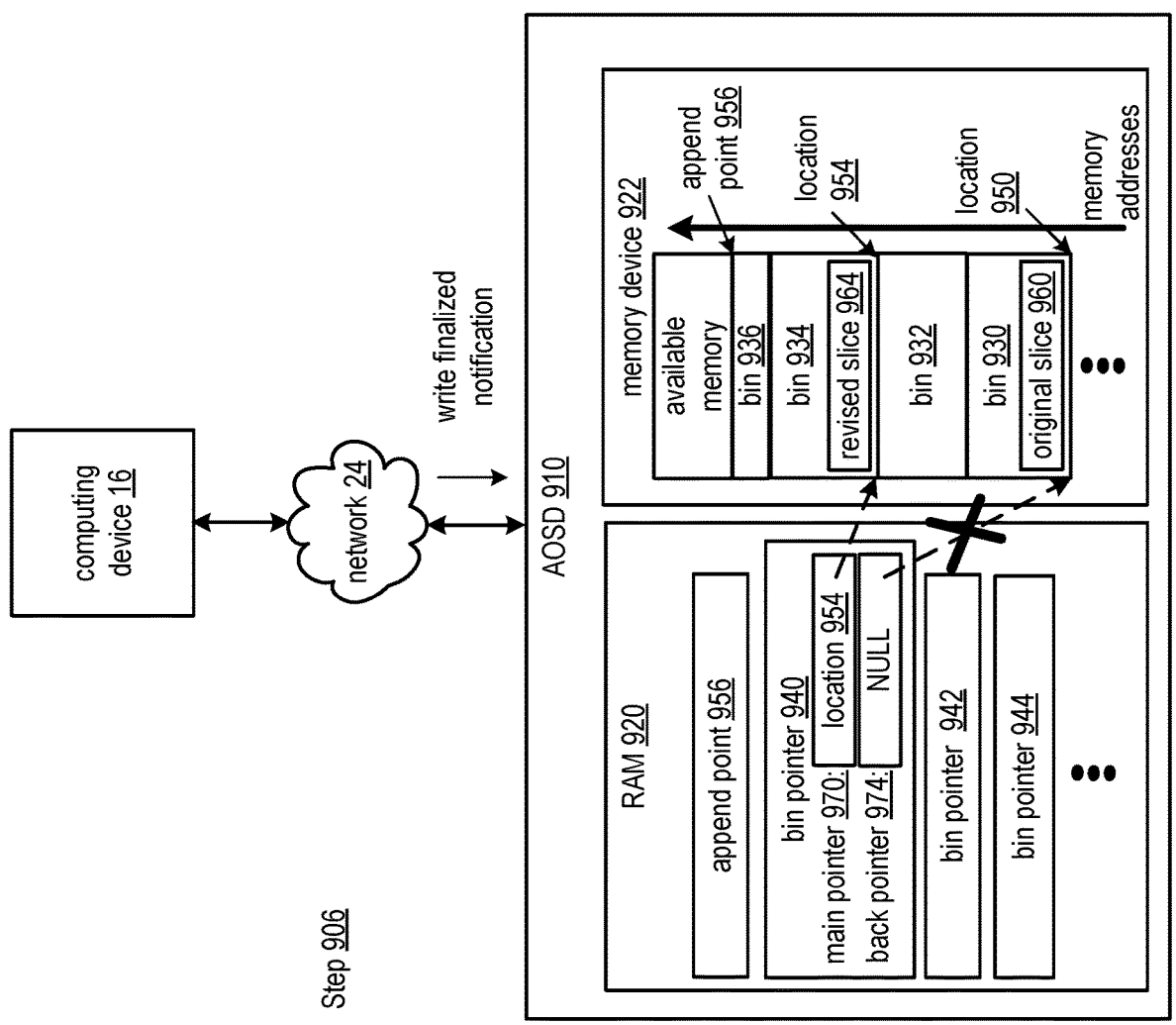

FIG. 9D illustrates a step 906 of the algorithm that corresponds to time 3. The AOSD determines that the write of revised slice 964 has finalized, for example, based on receiving a notification via network 24. The reference to the previous location is removed by assigning the back pointer 974 to a null value. The space allocated to bin 930 can be repurposed at a later time corresponding to a memory device cleanup, for example, where all of the other bins are shifted "down" based on the offset of bin 930, with their corresponding pointers and the append point being updated accordingly.

Figure 9E:
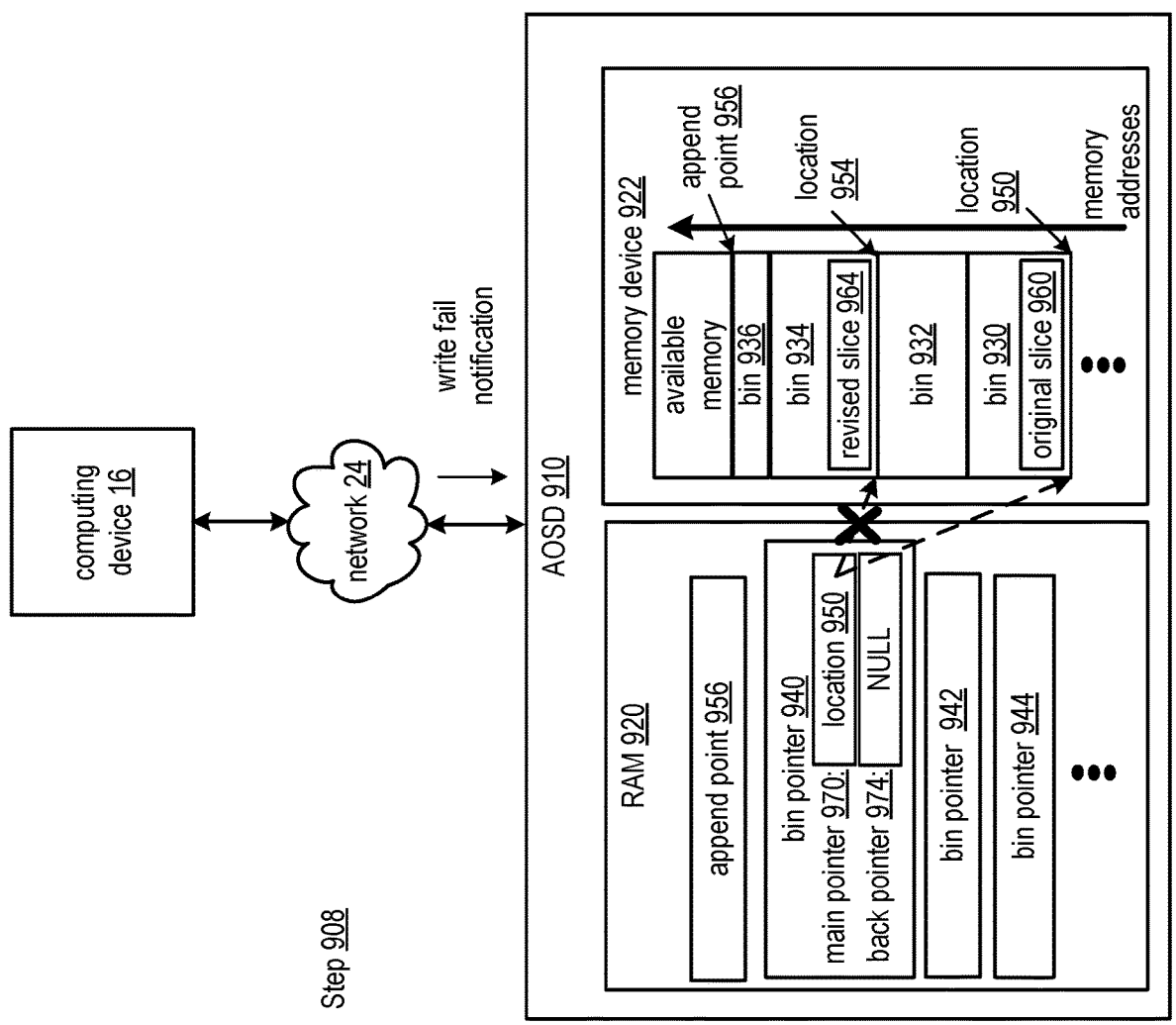

FIG. 9E illustrates an alternate step 908 that occurs instead of step 906, which can correspond to time 3 or a different time after time 2. This step corresponds to the alternate scenario where the AOSD determines that the write of revised slice 964 failed to reach the finalized state and/or that slice 964 must be reverted back to original slice 960. The location stored in back pointer 974 can be referenced by main pointer 970, and the back pointer can be assigned the null value. The space allocated to bin 934 can be repurposed at a later time corresponding to a memory device cleanup, for example, where all of the other bins are shifted "down" based on the offset of bin 934, with their corresponding pointers and the append point being updated accordingly.

In various embodiments, a processing system of a storage unit of a DSN includes at least one processor and a memory that stores operational instructions, that when executed by the at least one processor cause the processing system to receive a data slice for storage. The data slice is written by generating a first bin that includes the data slice and storing the first bin in a first location of a memory device of the storage unit. An original bin pointer associated with the data slice that includes a reference to the first location is generated. A revision of the data slice is later received and is written by generating second bin that includes the revision of the data slice and storing the second bin in a second location of the memory device, where the second bin is a revised version of the original bin. A modified bin pointer is generated by editing the original bin pointer to include a reference to the second location. A back pointer associated with the revision of the data slice that references the first location is generated in response to commencing writing of the revision of the data slice. The back pointer is deleted in response to determining that the revision of the data slice has reached a finalized write stage.

In various embodiments, the first bin is stored in a location of the memory device based on an original append point. An updated append point is generated in response to storing the first bin. A current append point determined in response to receiving the revision of the data slice. The second bin is stored in a location of the memory device based on the current append point. In various embodiments, generating the updated append point is based on the original append point and a length of the first bin.

In various embodiments, a set of outdated bins are determined at a time after the finalized write stage of the revision of the data slice, where the set of outdated bins includes the first bin. The set of outdated bins are deleted by the storage unit. In various embodiments, the first bin is included in the set of outdated bins based on the deletion of the back pointer that references the first location.

In various embodiments, creating the back pointer includes writing the back pointer to the second bin. The back pointer is deleted from the second bin in response to determining that the revision of the data slice has reached a finalized write stage. In various embodiments, the original bin pointer is stored in a random access memory (RAM) of the storage unit, and the back pointer is generated by retrieving the original bin pointer from RAM. In various embodiments, a request for the data slice is received from a requesting entity via the network. The data slice is retrieved from the memory device based on the original bin pointer. The data slice is transmitted to the requesting entity, and the revision of the data slice is generated by the requesting entity based on making revisions to this data slice received from the storage unit.

In various embodiments, the back pointer is generated in conjunction with generating the modified bin pointer. The modified bin pointer includes the back pointer, and the back pointer is deleted from the modified bin pointer in response to determining that the revision of the data slice has reached a finalized write stage. In various embodiments, a plurality of bin pointers correspond to a plurality of data slices stored in the memory device, and plurality of bin pointers are stored in a random access memory (RAM) of the storage unit. Each of the plurality of bin pointers includes a back pointer field, and generating the modified bin pointer includes assigning the reference to the first location to the back pointer field. Deleting the back pointer from the modified bin pointer includes assigning a null value to the back pointer field. In various embodiments, generating the original bin pointer includes assigning the back pointer field of the original bin pointer to the null value in response to determining that the data slice is not a revision.

In various embodiments, an outdated bin list is updated to include the reference to the first bin in response to determining that the revision of the data slice has reached the finalized write stage by retrieving the reference to the first bin from the back pointer field of the modified bin pointer prior to assigning the null value to the back pointer field. A plurality of bins indicated in the outdated bin list are deleted in response to determining a cleanup requirement.

In various embodiments, a length of the first bin is based on a size of the data slice, wherein a length of the second bin is based on a size of the revision of the data slice, and wherein a difference in length between the first bin and the second bin is based on a change of size between the data slice and the revision of the data slice. In various embodiments original bin pointer includes offset information that corresponds to a length of the first bin, and wherein generating the modified bin pointer includes updating the offset information to correspond to a length of the second bin. In various embodiments, the data slice is mapped to the original bin pointer based on an identifier of the data slice.

In various embodiments, writing the revision of the data slice is commenced at a first time, wherein the finalized write stage of the revision of the data slice is reached at a second time, and wherein a time period between the first time and the second time corresponds to a write-commit stage of the revision of the data slice. In various embodiments, generating a second modified bin pointer by deleting the reference to the second location and including the reference to the first location by utilizing the back pointer in response to determining that writing the revision of the data slice failed.

FIG. 10 is a flowchart illustrating an example algorithm for handling data slice revisions. In particular, a method is presented for use in association with one or more functions and features described in conjunction with FIGS. 1-9E, for execution by a storage unit in a DSN that includes a processor or via another processing system of a dispersed storage network that includes at least one processor and memory that stores instruction that configure the processor or processors to perform the steps described below. Step 1002 includes receiving, via a network, a data slice for storage. Step 1004 includes writing the data slice by generating a first bin that includes the data slice and storing the first bin in a first location of a memory device of the storage unit. Step 1006 includes generating an original bin pointer associated with the data slice that includes a reference to the first location. Step 1008 includes receiving, via the network, a revision of the data slice. Step 1010 includes writing the revision of the data slice by generating second bin that includes the revision of the data slice and storing the second bin in a second location of the memory device, where the second bin is a revised version of the first bin. Step 1012 includes generating a modified bin pointer by editing the original bin pointer to include a reference to the second location. Step 1014 includes generating a back pointer associated with the revision of the data slice that references the first location in response to commencing writing of the revision of the data slice. Step 1016 includes deleting the back pointer in response to determining that the revision of the data slice has reached a finalized write stage.

In various embodiments, the first bin is stored in a location of the memory device based on an original append point. An updated append point is generated in response to storing the first bin. A current append point determined in response to receiving the revision of the data slice. The second bin is stored in a location of the memory device based on the current append point. In various embodiments, generating the updated append point is based on the original append point and a length of the first bin.

In various embodiments, a set of outdated bins are determined at a time after the finalized write stage of the revision of the data slice, where the set of outdated bins includes the first bin. The set of outdated bins are deleted by the storage unit. In various embodiments, the first bin is included in the set of outdated bins based on the deletion of the back pointer that references the first location.

In various embodiments, creating the back pointer includes writing the back pointer to the second bin. The back pointer is deleted from the second bin in response to determining that the revision of the data slice has reached a finalized write stage. In various embodiments, the original bin pointer is stored in a random access memory (RAM) of the storage unit, and the back pointer is generated by retrieving the original bin pointer from RAM. In various embodiments, a request for the data slice is received from a requesting entity via the network. The data slice is retrieved from the memory device based on the original bin pointer. The data slice is transmitted to the requesting entity, and the revision of the data slice is generated by the requesting entity based on making revisions to this data slice received from the storage unit.

In various embodiments, the back pointer is generated in conjunction with generating the modified bin pointer. The modified bin pointer includes the back pointer, and the back pointer is deleted from the modified bin pointer in response to determining that the revision of the data slice has reached a finalized write stage. In various embodiments, a plurality of bin pointers correspond to a plurality of data slices stored in the memory device, and plurality of bin pointers are stored in a random access memory (RAM) of the storage unit. Each of the plurality of bin pointers includes a back pointer field, and generating the modified bin pointer includes assigning the reference to the first location to the back pointer field. Deleting the back pointer from the modified bin pointer includes assigning a null value to the back pointer field. In various embodiments, generating the original bin pointer includes assigning the back pointer field of the original bin pointer to the null value in response to determining that the data slice is not a revision.

In various embodiments, an outdated bin list is updated to include the reference to the first bin in response to determining that the revision of the data slice has reached the finalized write stage by retrieving the reference to the first bin from the back pointer field of the modified bin pointer prior to assigning the null value to the back pointer field. A plurality of bins indicated in the outdated bin list are deleted in response to determining a cleanup requirement.

In various embodiments, a length of the first bin is based on a size of the data slice, wherein a length of the second bin is based on a size of the revision of the data slice, and wherein a difference in length between the first bin and the second bin is based on a change of size between the data slice and the revision of the data slice. In various embodiments original bin pointer includes offset information that corresponds to a length of the first bin, and wherein generating the modified bin pointer includes updating the offset information to correspond to a length of the second bin. In various embodiments, the data slice is mapped to the original bin pointer based on an identifier of the data slice.

In various embodiments, writing the revision of the data slice is commenced at a first time, wherein the finalized write stage of the revision of the data slice is reached at a second time, and wherein a time period between the first time and the second time corresponds to a write-commit stage of the revision of the data slice. In various embodiments, generating a second modified bin pointer by deleting the reference to the second location and including the reference to the first location by utilizing the back pointer in response to determining that writing the revision of the data slice failed.

In various embodiments, a non-transitory computer readable storage medium includes at least one memory section that stores operational instructions that, when executed by a processing system of a dispersed storage network (DSN) that includes a processor and a memory, causes the processing system to receive a data slice for storage. The data slice is written by generating a first bin that includes the data slice and storing the first bin in a first location of a memory device of the storage unit. An original bin pointer associated with the data slice that includes a reference to the first location is generated. A revision of the data slice is later received and is written by generating second bin that includes the revision of the data slice and storing the second bin in a second location of the memory device, where the second bin is a revised version of the original bin. A modified bin pointer is generated by editing the original bin pointer to include a reference to the second location. A back pointer associated with the revision of the data slice that references the first location is generated in response to commencing writing of the revision of the data slice. The back pointer is deleted in response to determining that the revision of the data slice has reached a finalized write stage.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information. The memory elements can include one or more append optimal storage devices that store data according to an append-only write scheme.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a storage unit of a dispersed storage network (DSN) that includes a processor, the method comprises:
    receiving, via a network, a data slice for storage, wherein the data slice includes a slice name which includes a pillar number of the data slice;

writing the data slice by generating a first bin that includes the data slice and storing the first bin in a first location of a memory device of the storage unit;

generating an original bin pointer associated with the data slice that includes a reference to the first location;

receiving, via the network, a revision of the data slice;

writing the revision of the data slice by generating a second bin that includes the revision of the data slice and storing the second bin in a second location of the memory device, wherein the second bin is a revised version of the first bin; and generating a modified bin pointer by editing the original bin pointer to include a reference to the second location, wherein the modified bin pointer includes a back pointer that references the first location, and wherein the back pointer is deleted from the modified bin pointer when the revision of the data slice has reached a finalized write stage;

wherein the deleting the back pointer from the modified bin pointer includes assigning a null value to a back pointer field in the modified bin pointer; and wherein the original bin pointer is stored in the storage unit, and wherein the back pointer is generated by retrieving the original bin pointer from the storage unit.

2. The method of claim 1, further comprising:

storing the first bin in the first location of the memory device based on an original append point;

generating an updated append point in response to storing the first bin;

determining a current append point in response to receiving the revision of the data slice; and storing the second bin in the second location of the memory device based on the current append point.

3. The method of claim 2, wherein generating the updated append point is based on the original append point and a length of the first bin.

4. The method of claim 1, further comprising:

determining a set of outdated bins at a time after the finalized write stage of the revision of the data slice, wherein the set of outdated bins includes the first bin; and deleting the set of outdated bins.

5. The method of claim 4, wherein the first bin is included in the set of outdated bins based on the deletion of the back pointer that references the first location.

6. The method of claim 1, wherein creating the back pointer includes writing the back pointer to the second bin, and wherein the back pointer is deleted from the second bin in response to determining that the revision of the data slice has reached the finalized write stage.

7. The method of claim 1, further comprising:

receiving a request for the data slice from a requesting entity via the network.

8. The method of claim 7, further comprising:

retrieving the data slice from the memory device based on the original bin pointer.

9. The method of claim 8, further comprising:

transmitting the data slice to the requesting entity;

wherein the revision of the data slice is generated by the requesting entity based on making revisions to the data slice received from the storage unit.

10. The method of claim 1, wherein the modified bin pointer includes the back pointer field and the generating the modified bin pointer includes assigning the reference to the first location to the back pointer field.

11. The method of claim 10, wherein generating the original bin pointer includes assigning the back pointer field of the original bin pointer to the null value in response to determining that the data slice is not a revision.

12. The method of claim 11, further comprising:

updating an outdated bin list to include the reference to the first bin in response to determining that the revision of the data slice has reached the finalized write stage by retrieving the reference to the first bin from the back pointer field of the modified bin pointer prior to assigning the null value to the back pointer field; and deleting a plurality of bins indicated in the outdated bin list in response to determining a cleanup requirement.

13. The method of claim 1, wherein a length of the first bin is based on a size of the data slice, wherein a length of the second bin is based on a size of the revision of the data slice, and wherein a difference in length between the first bin and the second bin is based on a change of size between the data slice and the revision of the data slice.

14. The method of claim 1, wherein the original bin pointer includes offset information that corresponds to a length of the first bin, and wherein generating the modified bin pointer includes updating the offset information to correspond to a length of the second bin.

15. The method of claim 1, wherein writing the revision of the data slice is commenced at a first time, wherein the finalized write stage of the revision of the data slice is reached at a second time, and wherein a time period between the first time and the second time corresponds to a write commit stage of the revision of the data slice.

16. The method of claim 1, further comprising:

generating a second modified bin pointer by deleting the reference to the second location and including the reference to the first location by utilizing the back pointer in response to determining that the writing the revision of the data slice failed.

17. The method of claim 1, wherein the data slice is mapped to the original bin pointer based on an identifier of the data slice.

18. A processing system of a storage unit of a dispersed storage network (DSN) comprises:

at least one processor;

a memory that stores operational instructions, that when executed by the at least one processor cause the processing system to:

receive, via a network, a data slice for storage, wherein the data slice includes a slice name which includes a pillar number of the data slice;

write the data slice by generating a first bin that includes the data slice and storing the first bin in a first location of a memory device of the storage unit;

generate an original bin pointer associated with the data slice that includes a reference to the first location;

receive, via the network, a revision of the data slice;

write the revision of the data slice by generating a second bin that includes the revision of the data slice and storing the second bin in a second location of the memory device, wherein the second bin is a revised version of the first bin;

generate a modified bin pointer by editing the original bin pointer to include a reference to the second location; and generate a modified bin pointer by editing the original bin pointer to include a reference to the second location, wherein the modified bin pointer includes a back pointer that references the first location; and delete the back pointer from the modified bin pointer when the revision of the data slice has reached a finalized write stage, wherein the deleting the back pointer from the modified bin pointer includes assigning a null value to a back pointer field in the modified bin pointer; and wherein the original bin pointer is stored in the storage unit, and wherein the back pointer is generated by retrieving the original bin pointer from the storage unit.

19. The processing system of claim 18, wherein the operational instructions, when executed by the at least one processor, further cause the processing system to:

store the first bin in the first location of the memory device based on an original append point;

generate an updated append point in response to storing the first bin;

determine a current append point in response to receiving the revision of the data slice; and store the second bin in the second location of the memory device based on the current append point.

20. A non-transitory computer readable storage medium comprises:

at least one memory section that stores operational instructions that, when executed by a processing system of a dispersed storage network (DSN) that includes a processor and a memory, causes the processing system to:

receive, via a network, a data slice for storage, wherein the data slice includes a slice name which includes a pillar number of the data slice;

write the data slice by generating a first bin that includes the data slice and storing the first bin in a first location of a memory device;

generate an original bin pointer associated with the data slice that includes a reference to the first location;

receive, via the network, a revision of the data slice;

write the revision of the data slice by generating a second bin that includes the revision of the data slice and storing the second bin in a second location of the memory device, wherein the second bin is a revised version of the first bin; and generate a modified bin pointer by editing the original bin pointer to include a reference to the second location, wherein the modified bin pointer includes a back pointer that references the first location; and delete the back pointer from the modified bin pointer when the revision of the data slice has reached a finalized write stage;

wherein the deleting the back pointer from the modified bin pointer includes assigning a null value to a back pointer field in the modified bin pointer; and wherein the original bin pointer is stored in the memory device, and wherein the back pointer is generated by retrieving the original bin pointer from the memory device.

* * * * *